US 11,763,039 B2

(12) United States Patent
Nagarajegowda et al.

(10) Patent No.: US 11,763,039 B2
(45) Date of Patent: Sep. 19, 2023

(54) AUTOMATICALLY DETERMINING STORAGE SYSTEM DATA BREACHES USING MACHINE LEARNING TECHNIQUES

(71) Applicant: Dell Products L.P., Round Rock, TX (US)

(72) Inventors: Deepak Nagarajegowda, Cary, NC (US); Bina K. Thakkar, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 17/135,274

(22) Filed: Dec. 28, 2020

(65) Prior Publication Data
US 2022/0207188 A1 Jun. 30, 2022

(51) Int. Cl.
*G06F 21/62* (2013.01)
*G06F 21/78* (2013.01)
(Continued)

(52) U.S. Cl.
CPC ........ *G06F 21/78* (2013.01); *G06F 18/24155* (2023.01); *G06F 18/295* (2023.01);
(Continued)

(58) Field of Classification Search
CPC ........ G06F 21/78; G06F 21/54; G06F 21/554; G06K 9/6278; G06K 9/6297; G06N 20/00
See application file for complete search history.

(56) References Cited

U.S. PATENT DOCUMENTS 10,402,573 B1 * 9/2019 Galligan ............. H04L 63/0807
10,970,395 B1 * 4/2021 Bansal ................. G06F 21/566
(Continued)

OTHER PUBLICATIONS

McGee, M. K., BankInfo Security, Veterans' Data at Risk on Shared Network Storage Devices, https://www.bankinfosecurity.com/veterans-data-at-risk-on-shared-network-storage-devices-a-13281, pp. 1-5, Oct. 22, 2019.
(Continued)

*Primary Examiner* — Joseph P Hirl
*Assistant Examiner* — Aayush Aryal
(74) *Attorney, Agent, or Firm* — Ryan, Mason & Lewis, LLP

(57) ABSTRACT

Methods, apparatus, and processor-readable storage media for automatically determining storage system data breaches using machine learning techniques are provided herein. An example computer-implemented method includes configuring a storage system by designating at least one storage object within the storage system for storing data identified as to be protected from breach; generating at least one multivariate data breach probability function using historical performance data of the designated storage object(s) and/or historical capacity data of the designated storage object(s); calculating at least one data breach score using the at least one multivariate data breach probability function, one or more machine learning techniques, and additional performance data of the designated storage object(s) and/or additional capacity data of the designated storage object(s); and performing one or more automated actions based at least in part on the at least one data breach score.

20 Claims, 6 Drawing Sheets

(51) Int. Cl.
    *G06F 21/54*    (2013.01)
    *G06N 20/00*    (2019.01)
    *G06F 21/55*    (2013.01)
    *G06F 18/20*    (2023.01)
    *G06F 18/2415*    (2023.01)

(52) U.S. Cl.
    CPC ............ *G06F 21/54* (2013.01); *G06F 21/554* (2013.01); *G06N 20/00* (2019.01)

(56) References Cited

U.S. PATENT DOCUMENTS

| | | | | |
|---|---|---|---|---|
| 2018/0279921 | A1* | 10/2018 | Datta | A61B 5/1123 |
| 2018/0322305 | A1* | 11/2018 | Gorenstein | H04L 63/1425 |
| 2020/0057163 | A1* | 2/2020 | Bromberg | G01S 19/256 |
| 2020/0184102 | A1* | 6/2020 | Amarendran | G06F 11/1469 |
| 2020/0267057 | A1* | 8/2020 | Garvey | H04L 41/0886 |
| 2020/0349576 | A1* | 11/2020 | Karmakar | G06Q 20/4016 |

OTHER PUBLICATIONS

Villanova University, Breach Detection in Cybersecurity, https://www.villanovau.com/resources/iss/breach-detection/, pp. 1-8, May 6, 2019.

\* cited by examiner

US 11,763,039 B2

AUTOMATICALLY DETERMINING STORAGE SYSTEM DATA BREACHES USING MACHINE LEARNING TECHNIQUES

FIELD

The field relates generally to information processing systems, and more particularly to techniques for providing security in such systems.

BACKGROUND

Commonly, data breaches occur in connection with attempts to gain unauthorized access to high-value and/or sensitive data. However, conventional security techniques are typically time-intensive, with non-trivial amounts of time elapsing between incident and detection. Moreover, such conventional techniques operate at the application and network layers, while data security attacks often bypass these layers to access data directly from databases and/or tables.

SUMMARY

Illustrative embodiments of the disclosure provide techniques for automatically determining storage system data breaches using machine learning techniques. An exemplary computer-implemented method includes configuring at least one storage system by designating at least one storage object within the at least one storage system for storing data identified as to be protected from breach, and generating at least one multivariate data breach probability function using at least one of historical performance data of the at least one designated storage object and historical capacity data of the at least one designated storage object. The method also includes calculating at least one data breach score using the at least one multivariate data breach probability function, one or more machine learning techniques, and at least one of additional performance data of the at least one designated storage object and additional capacity data of the at least one designated storage object. Further, the method additionally includes performing one or more automated actions based at least in part on the at least one data breach score.

Illustrative embodiments can provide significant advantages relative to conventional security techniques. For example, problems associated with time-intensive approaches that focus merely on network and application layers are overcome in one or more embodiments through automatically determining storage system-level data breaches using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
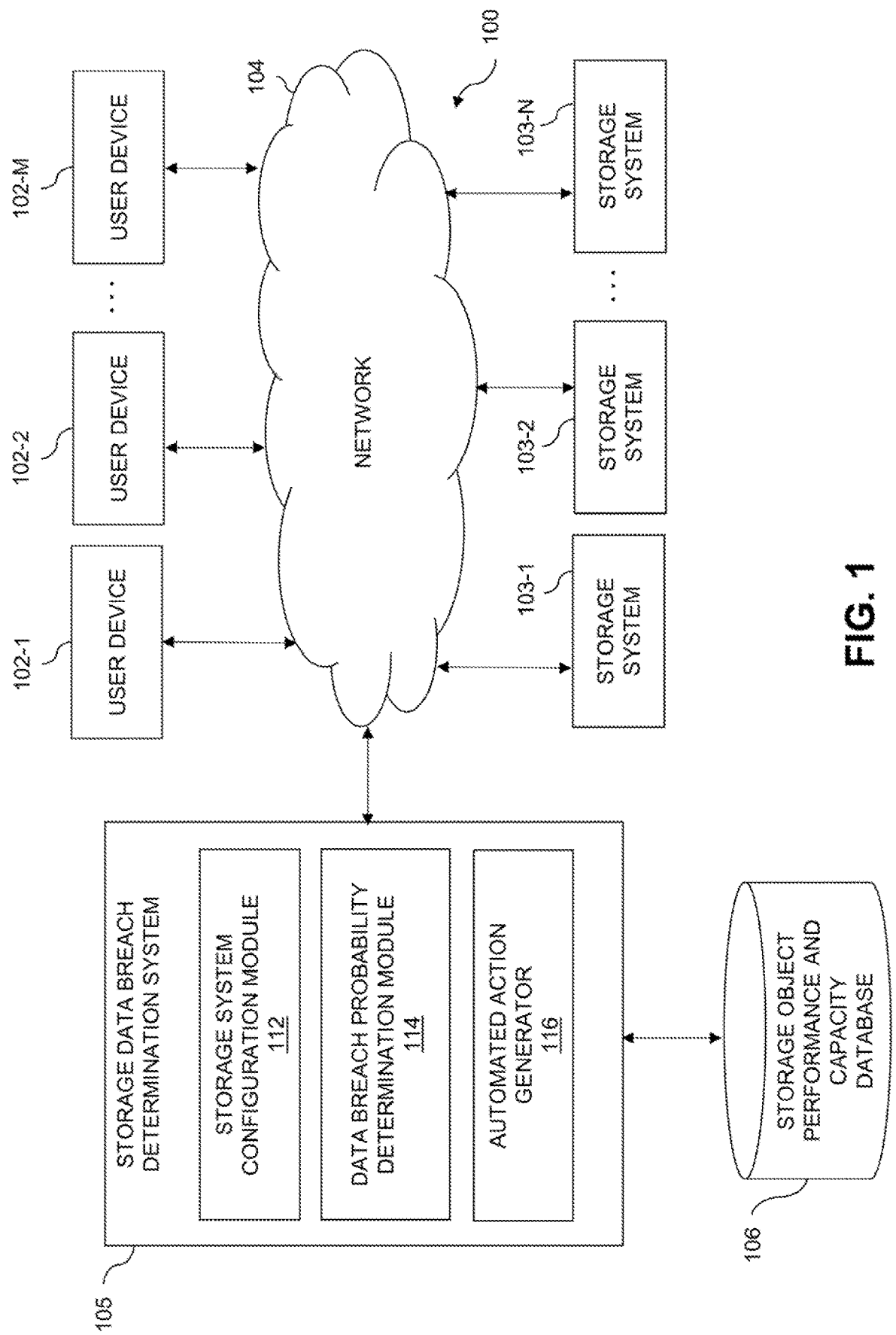
FIG. 1 shows an information processing system configured for automatically determining storage system data breaches using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of storage systems 103-1, 103-2, . . . 103-N, collectively referred to herein as storage systems 103. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is storage data breach determination system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The storage systems 103 may comprise, for example, storage objects such as pools, file systems, logical storage volumes (e.g., logical units or LUNs), etc. The storage systems 103 in some embodiments comprise respective storage systems associated with a particular company, organization or other enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, storage data breach determination system 105 can have an associated database 106 configured to store data pertaining to performance metrics and capacity information of one or more storage objects of storage systems 103, which comprise, for example, at least one central processing unit metric, at least one input-output operations per second metric, at least one latency metric, at least one metric pertaining to read operations, at least one metric pertaining to write operations, etc.

The database 106 in the present embodiment is implemented using one or more storage systems associated with storage data breach determination system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with storage data breach determination system 105 are one or more input-output devices, which illustratively comprise keyboards, displays or other types of input-output devices in any combination. Such input-output devices can be used, for example, to support one or more user interfaces to storage data breach determination system 105, as well as to support communication between storage data breach determination system 105 and other related systems and devices not explicitly shown.

Additionally, storage data breach determination system 105 in the FIG. 1 embodiment is assumed to be implemented using at least one processing device. Each such processing device generally comprises at least one processor and an associated memory, and implements one or more functional modules for controlling certain features of storage data breach determination system 105.

More particularly, storage data breach determination system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows storage data breach determination system 105 to communicate over the network 104 with the user devices 102, and illustratively comprises one or more conventional transceivers.

The storage data breach determination system 105 further comprises a storage system configuration module 112, a data breach probability determination module 114, and an automated action generator 116.

It is to be appreciated that this particular arrangement of modules 112, 114 and 116 illustrated in storage data breach determination system 105 of the FIG. 1 embodiment is presented by way of example only, and alternative arrangements can be used in other embodiments. For example, the functionality associated with modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for automatically determining storage system data breaches using machine learning techniques involving storage systems 103 and user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, storage data breach determination system 105 and storage object performance and capacity database 106 can be on and/or part of the same processing platform. Additionally or alternatively, in one or more embodiments, storage data breach determination system 105 and storage object performance and capacity database 106 can be implemented in at least one of the storage systems 103 and/or in an associated management server or set of servers.

An exemplary process utilizing modules 112, 114 and 116 of an example storage data breach determination system 105 in computer network 100 will be described in more detail with reference to the flow diagram of FIG. 4.

As noted herein, external attackers commonly bypass application and network layers to access data directly from one or more databases and/or tables. Accordingly, at least one embodiment includes detecting data breaches in real-time using unique storage configuration as well as multi-variate statistical probability and Bayesian inference techniques leveraging storage metrics data. Such an embodiment includes determining data access patterns at the storage layer to detect breaches by making use of storage object configuration data. More specifically, at least one embodiment includes leveraging storage architecture and/or configuration information using at least one Bayesian inference technique, which considers new data and/or evidence to update a prior probability distribution.

As further detailed herein, one or more embodiments include processing input data using beta and Poisson distributions, as well as implementing probability density techniques for each of one or more storage metrics and drawing one or more actionable insights using Bayesian inference techniques, making use of at least a portion of the probability density function(s). With respect to processing input data using beta and Poisson distributions, at least one example embodiment includes analyzing observations (e.g., data points), counting the instances of each unique observation, and plotting the count(s) on an x-axis and observation value(s) on a y-axis to determine the distribution(s).

Also, in one or more embodiments, drawing insights can include calculating at least one breach probability and at least one corresponding breach score (derived from at least one algorithm, such as further detailed herein). Additionally or alternatively, such an embodiment can include not only detecting data breaches but also performing automated actions related to preventing and/or limiting such data breaches such as, for example, automatically locking one or more relevant storage objects automatically. It is to be appreciated that each storage object can have a configurable option (e.g., available to a storage administrator or enabled via an automated mechanism) to lock and/or unlock access thereto. Accordingly, at least one embodiment can include executing a specific command to lock or unlock a particular storage object.

Figure 2:
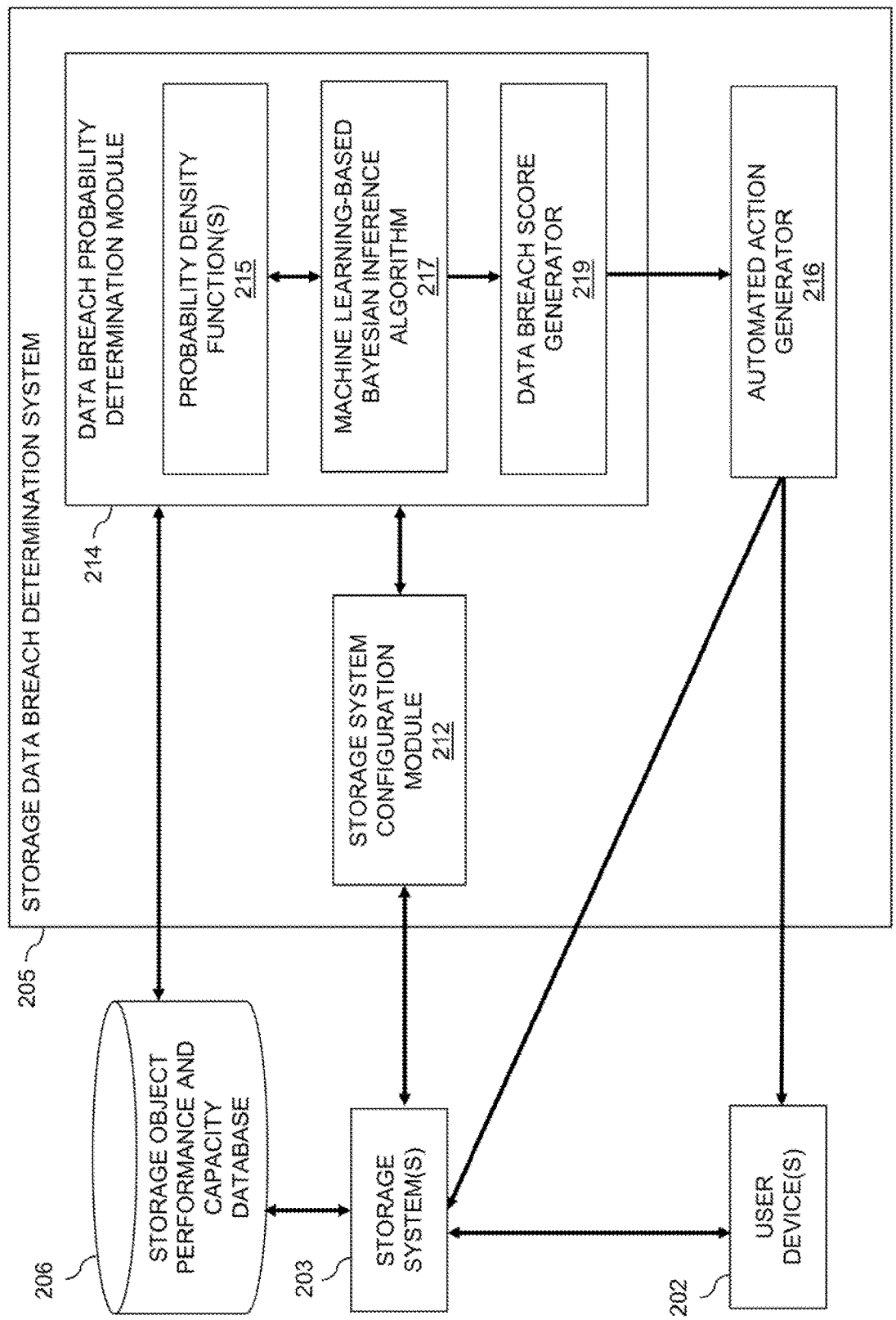
FIG. 2 shows an information processing system configured for automatically determining storage system data breaches using machine learning techniques and an example workflow using such a system in an illustrative embodiment.

FIG. 2 shows an information processing system configured for automatically determining storage system data breaches using machine learning techniques and an example workflow using such a system in an illustrative embodiment. By way of example, such a workflow is carried out at the storage layer using storage data breach determination system 205 and is agnostic of the application layer(s) and network layer(s) of the system(s) in question. As depicted in FIG. 2, a first step involves configuring storage arrays and/or storage objects within storage system(s) 203 using storage system configuration module 212. For example, such a configuration can include creating multiple storage objects in one or more storage arrays. Additionally, storage system configuration module 212 can also designate and/or identify one or more of the storage objects as storing particular (e.g., important, sensitive, and/or confidential) data to be protected from data breach(es). Further, in such an embodiment, the remaining storage objects can be used to store other data (e.g., non-confidential data, less important data, and/or non-sensitive data).

Additionally, at least one embodiment includes mounting one or more storage objects to one or more applications and/or virtual machines (VMs). As is to be appreciated in connection with one or more embodiments, with respect to VMs accessing different types of storage, applications run on VMs, and VMs run on a host (i.e. a physical machine), which is connected to one or more storage devices. Also, the VMs can have virtual disks, which hide the physical storage layer from the VMs. In such an embodiment, the relevant application(s) and/or database(s) that contain data to be protected are designed to store such data on at least one designated storage object. By way of example, confidential and/or sensitive data can be segregated (from a larger dataset) and stored on a single pool, while non-confidential and/or non-sensitive data can be stored on other pools.

Advantages of storage object configuration such as detailed above can include clear separation of confidential/sensitive data and non-confidential/non-sensitive data, and because of this, input-output (IO) requests can be monitored separately for each type of data. In one or more embodiments, such configuration enables the application of data encryption on a selective basis. Additionally, specific actions related to data breach prevention and/or amelioration (e.g., locking a particular storage object) can be applied selectively to a particular storage object.

As also depicted in FIG. 2, a data collection step includes data breach probability determination module 214 collecting performance metrics (e.g., central processing unit (CPU) metrics, input-output operations per second (IOPS), latency, percentage read, percentage write, breakdown metrics for reads/writes, etc.) and capacity data (e.g., available capacity, used capacity, etc.) for one or more storage objects from database 206. In one or more example embodiments, such data collection will be carried out for all storage components of a given storage system. A subsequent analysis step, as illustrated in FIG. 2, includes building probability density function(s) 215 to generate likelihood estimates in connection with at least one Bayesian inference technique. With respect to building probability density functions, consider the following example. Let X represent a continuous random variable, and as such, a probability distribution or probability density function of X is a function ($f(x)$) such that for any two numbers a and b, with a≤b, $P(a \leq X \leq b) = \int_a^b f(x)dx$. That is, the probability that X takes on a value in the interval [a, b] is the area above this interval and under the graph of the density function. Also, the graph of $f(x)$ can be referred to as a density curve.

At least one embodiment includes converting at least a portion of the obtained and/or collected data (as well as any generated and/or obtained data insights) to probability distributions using one or more probability density functions for each of one or more given storage metrics. Such an embodiment, for example, can include using Poisson and beta distributions to detect one or more data patterns in at least a portion of the obtained and/or collected data. As used herein, a Poisson distribution is a discrete probability distribution for the counts of events that occur randomly in a given interval of time (or space). By way of illustration, if X=the number of events in a given interval, then, if the mean number of events per interval is λ, the probability of observing x events in a given interval is provided as:

$$P(X = x) = e^{-\lambda} \frac{\lambda^x}{x!},$$

wherein x=0, 1, 2, 3, 4, . . . . For example, consider a use case wherein data access occurs randomly at an average rate of 1.8 gigabytes (GB) per hour. What, then, is the probability of observing 4 GB in a given hour? In accordance with an example embodiment, let X=data access in a given hour, wherein events occur randomly and the mean rate λ=1.8, meaning that X~P(1.8). The above-noted formula can be used to calculate the probability of observing exactly 4 GBs in a given hour, which would be 0.0723.

As also depicted in FIG. 2, a subsequent step in the example workflow includes generating a score (e.g., a data breach score). Using machine learning-based Bayesian inference algorithm 217, in connection with new and/or additional data (also referred to herein as evidence), one or more embodiments include calculating the probability of at least one data breach and generating at least one corresponding data breach score (e.g., at a given interval) based at least in part on the calculated probability (via data breach score generator 219). By way merely of illustration, using, for example, the equation depicted in FIG. 3, at least one embodiment can include deriving the values of various probabilities from a combination of probability distribution charts and probability calculations. Such an embodiment can include using such derived values to calculate the probability of occurrence of a data breach. In an example embodiment, this probability value can have a range from 0 to 1, and the value of the probability can then, for instance, be multiplied by 100 to obtain the data breach score.

Such an embodiment includes using at least one Bayesian inference technique to assess the risk and/or likelihood of a data breach based at least in part on relevant analyzed data (e.g., current data). As new data are collected, one or more embodiments include using the new data to calculate the probability of a data breach event, as well as a data breach score based at least in part on the probability calculation.

Additionally, and as further detailed below, FIG. 2 also depicts a step that includes performing, using automated action generator 216, at least one automated action based at least in part on the calculated data breach score. Such an action can be generated and/or carried out in connection with user device(s) 202 (e.g., the automatic generation and output of one or more alerts or notifications pertaining to the data breach score and/or probability) and/or storage system(s) 203 (e.g., automatically locking at least one designated storage object, selectively encrypting data within at least one designated storage object, etc.).

Figure 3:
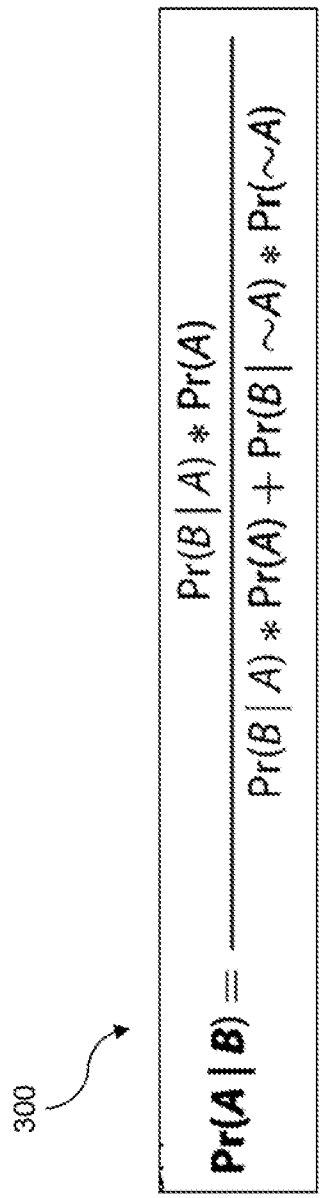
FIG. 3 shows an example probability function implemented in an illustrative embodiment.

FIG. 3 shows an example probability function implemented in an illustrative embodiment. In such an embodiment, example probability function 300 is executed by at least one processing system and/or device. For example, probability function 300 may be embodied as and/or incorporated in a portion of a software implementation of at least part of storage data breach determination system 105 of the FIG. 1 embodiment.

The example probability function 300 illustrates that the posterior probability of hypothesis A, given data B=((the likelihood of the data, B, given hypothesis A)*(prior probability of hypothesis A))/((the likelihood of the data, B, given hypothesis A)*(prior probability of hypothesis A)+ (the likelihood of the data, B, given a hypothesis similar to hypothesis A)*(prior probability of a hypothesis similar to hypothesis A)). More specifically, in an example embodiment, such a function can encompass the following: Probability of observing a data breach given new data=((Probability of observing new data given a data breach)* (Probability of new data))/Probability of data breach.

It is to be appreciated that this particular example probability function shows just one example probability function, and alternative functions can be used in other embodiments.

Accordingly, one or more embodiments include detecting data patterns related to data breach events using at least one prior probability distribution, wherein the probability of a data breach given a new data stream is calculated using data likelihood values (that is, the probabilities calculated as output from the distribution function(s)) based at least in part on Bayesian inference techniques. Such an embodiment can include using one or more Markov chain Monte Carlo (MCMC) methods to calculate data likelihood values. By way of illustration, in an example embodiment, MCMC enables such an embodiment to draw samples from a distribution even if such samples cannot be computed. MCMC can be used to sample from a posterior distribution (i.e., what is sought to be known) over various parameters, and can also be used to compute the distribution over such parameters given a set of observations (e.g., data points) and at least one prior belief.

As noted above, one or more embodiments include executing at least one automated action (e.g., an action to prevent and/or limit a data breach) based at least in part on a data breach score. By way of example, in such an embodiment, based at least in part on exceeding a given data breach score threshold, storage objects can be configured to deactivate and/or transition to an offline mode automatically (e.g., enabling a storage administrator to perform an audit before bringing the storage object(s) online). Additionally or alternatively, in one or more embodiments, when a data breach score exceeds a given threshold, an alert can be generated (e.g., to notify a system administrator of a need for further investigation). Also, in at least one embodiment implemented as part of autonomous storage systems, a storage object that experienced a data breach and/or is associated with a data breach score exceeding a given threshold can be locked automatically to prevent further read/write requests.

Figure 4:
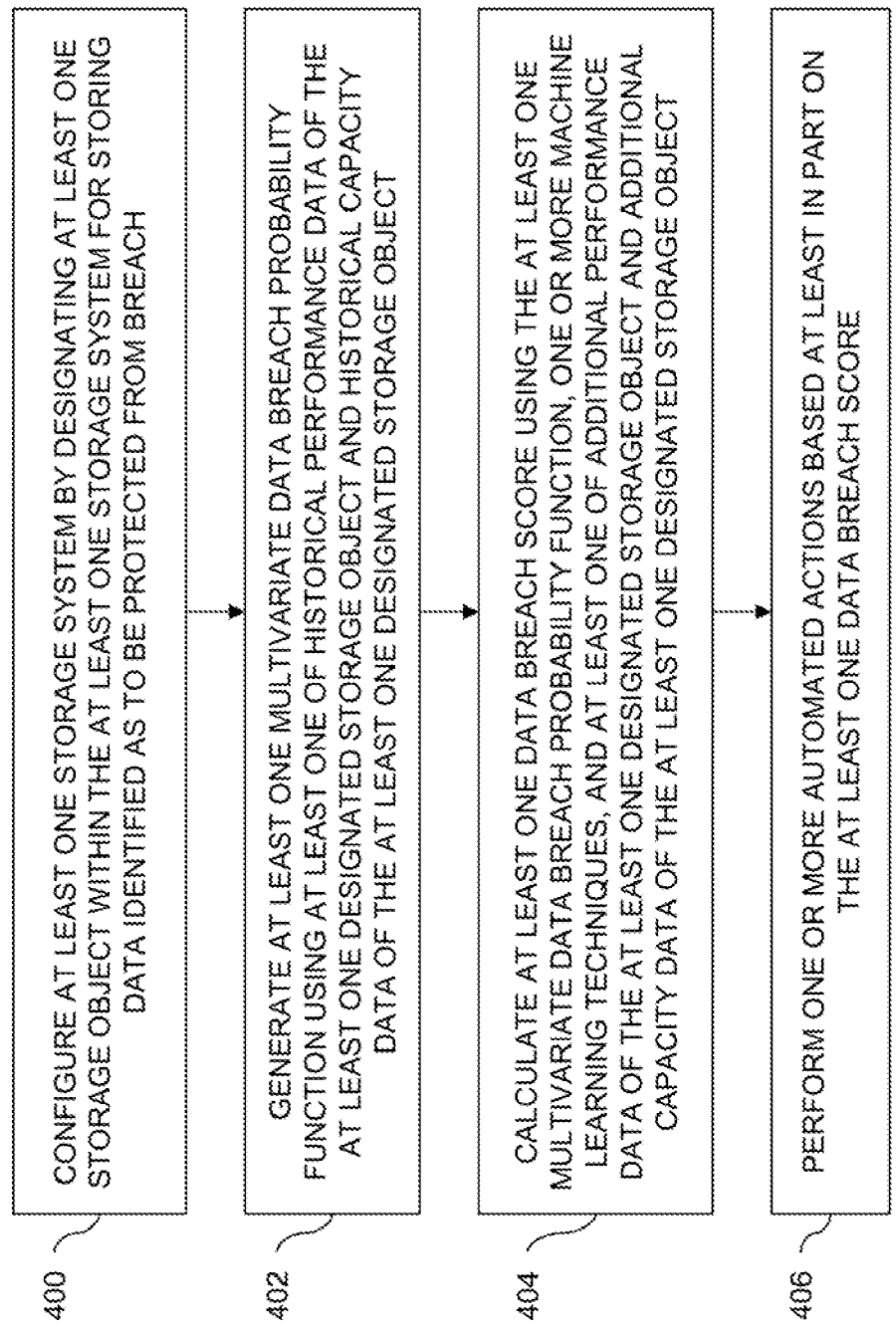
FIG. 4 is a flow diagram of a process for automatically determining storage system data breaches using machine learning techniques in an illustrative embodiment.

FIG. 4 is a flow diagram of a process for automatically determining storage system data breaches using machine learning techniques in an illustrative embodiment. It is to be understood that this particular process is only an example, and additional or alternative processes can be carried out in other embodiments.

In this embodiment, the process includes steps 400 through 406. These steps are assumed to be performed by storage data breach determination system 105 utilizing modules 112, 114 and 116. Step 400 includes configuring at least one storage system by designating at least one storage object within the at least one storage system for storing data identified as to be protected from breach.

Step 402 includes generating at least one multivariate data breach probability function using at least one of historical performance data of the at least one designated storage object and historical capacity data of the at least one designated storage object. In at least one embodiment, generating the at least one multivariate data breach probability function includes processing the at least one of historical performance data of the at least one designated storage object and historical capacity data of the at least one designated storage object using one or more beta distributions and one or more Poisson distributions. Additionally or alternatively, generating the at least one multivariate data breach probability function can include generating at least one probability density function. Also, in one or more embodiments, the historical performance data can include at least one central processing unit metric, at least one input-output operations per second metric, at least one latency metric, at least one metric pertaining to read operations, and/or at least one metric pertaining to write operations.

Step 404 includes calculating at least one data breach score using the at least one multivariate data breach probability function, one or more machine learning techniques (e.g., one or more machine learning-based Bayesian inference techniques), and at least one of additional performance data of the at least one designated storage object and additional capacity data of the at least one designated storage object. As detailed herein, in at least one embodiment, using one or more machine learning-based Bayesian inference techniques includes using one or more machine learning-based Markov chain Monte Carlo algorithms. Additionally or alternatively, calculating the at least one data breach score can include calculating at least one data breach score upon obtaining at least one of new performance data of the at least one designated storage object and new capacity data of the at least one designated storage object.

Step 406 includes performing one or more automated actions based at least in part on the at least one data breach score. In at least one embodiment, performing the one or more automated actions can include performing the at least one automated action upon a determination that the at least one data breach score exceeds a given threshold value, automatically configuring the at least one designated storage object to transition to an offline mode, selectively encrypting at least a portion of the data within the at least one designated storage object, and/or automatically generating and outputting, to one or more storage administrator entities, at least one alert.

Additionally, one or more embodiments can include updating the at least one multivariate data breach probability function using the at least one of additional performance data of the at least one designated storage object and additional capacity data of the at least one designated storage object.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically determine storage system data breaches using machine learning techniques. These and other embodiments can effectively overcome problems associated with time-intensive approaches that focus merely on network and application layers.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
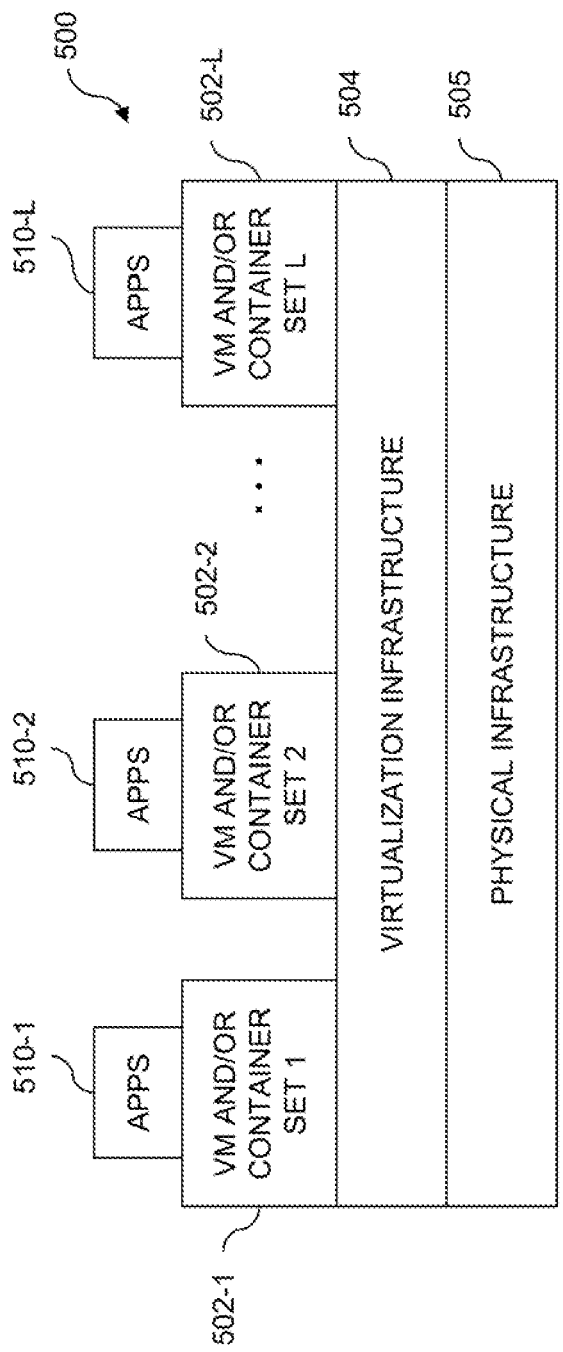
FIGS. 5 and 6 show examples of processing platforms that may be utilized to implement at least a portion of an information processing system in illustrative embodiments.
Figure 6:
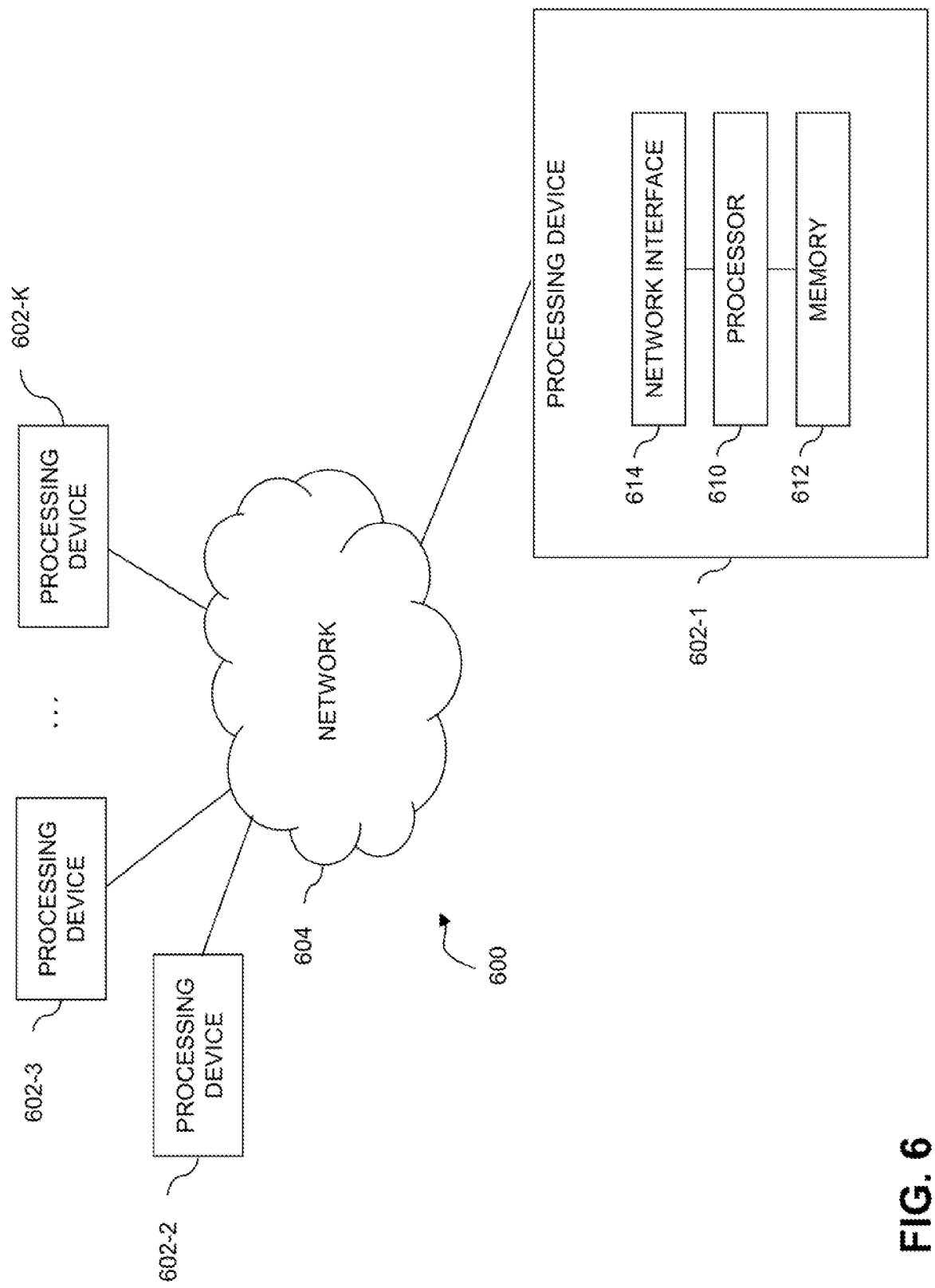

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple VMs and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, ... 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

The memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
configuring at least one storage system by designating at least one storage object within the at least one storage system for storing data identified as to be protected from breach;
generating at least one multivariate data breach probability function using at least one of historical performance data of the at least one designated storage object and historical capacity data of the at least one designated storage object, wherein generating the at least one multivariate data breach probability function comprises determining one or more data access patterns, pertaining to one or more amounts of data accessed per one or more temporal periods, associated with the at least one designated storage object by processing the at least one of historical performance data of the at least one designated storage object and historical capacity data of the at least one designated storage object;
calculating at least one data breach score using (i) the at least one multivariate data breach probability function, (ii) one or more machine learning techniques, and (iii) at least one of additional performance data of the at least one designated storage object and additional capacity data of the at least one designated storage object; and performing one or more automated actions based at least in part on the at least one data breach score;
wherein the method is performed by at least one processing device comprising a processor coupled to a memory.

2. The computer-implemented method of claim 1, wherein generating the at least one multivariate data breach probability function comprises processing the at least one of historical performance data of the at least one designated storage object and historical capacity data of the at least one designated storage object using one or more beta distributions and one or more Poisson distributions.

3. The computer-implemented method of claim 1, wherein using one or more machine learning techniques comprises using one or more machine learning-based Bayesian inference techniques.

4. The computer-implemented method of claim 1, wherein using one or more machine learning techniques comprises using one or more machine learning-based Markov chain Monte Carlo algorithms.

5. The computer-implemented method of claim 1, wherein generating the at least one multivariate data breach probability function comprises generating at least one probability density function.

6. The computer-implemented method of claim 1, wherein performing the one or more automated actions comprises performing the at least one automated action upon a determination that the at least one data breach score exceeds a given threshold value.

7. The computer-implemented method of claim 1, wherein performing the one or more automated actions comprises automatically configuring the at least one designated storage object to transition to an offline mode.

8. The computer-implemented method of claim 1, wherein performing the one or more automated actions comprises selectively encrypting at least a portion of the data within the at least one designated storage object.

9. The computer-implemented method of claim 1, wherein performing the one or more automated actions comprises automatically generating and outputting, to one or more storage administrator entities, at least one alert.

10. The computer-implemented method of claim 1, further comprising:
updating the at least one multivariate data breach probability function using the at least one of additional performance data of the at least one designated storage object and additional capacity data of the at least one designated storage object.

11. The computer-implemented method of claim 1, wherein calculating the at least one data breach score comprises calculating at least one data breach score upon obtaining at least one of new performance data of the at least one designated storage object and new capacity data of the at least one designated storage object.

12. The computer-implemented method of claim 1, wherein the historical performance data comprises one or more of at least one central processing unit metric, at least one input-output operations per second metric, at least one latency metric, at least one metric pertaining to read operations, and at least one metric pertaining to write operations.

13. A non-transitory processor-readable storage medium having stored therein program code of one or more software programs, wherein the program code when executed by at least one processing device causes the at least one processing device:
to configure at least one storage system by designating at least one storage object within the at least one storage system for storing data identified as to be protected from breach;
to generate at least one multivariate data breach probability function using at least one of historical performance data of the at least one designated storage object and historical capacity data of the at least one designated storage object, wherein generating the at least one multivariate data breach probability function comprises determining one or more data access patterns, pertaining to one or more amounts of data accessed per one or more temporal periods, associated with the at least one designated storage object by processing the at least one of historical performance data of the at least one designated storage object and historical capacity data of the at least one designated storage object;
to calculate at least one data breach score using (i) the at least one multivariate data breach probability function, (ii) one or more machine learning techniques, and (iii) at least one of additional performance data of the at least one designated storage object and additional capacity data of the at least one designated storage object; and
to perform one or more automated actions based at least in part on the at least one data breach score.

14. The non-transitory processor-readable storage medium of claim 13, wherein generating the at least one multivariate data breach probability function comprises processing the at least one of historical performance data of the at least one designated storage object and historical capacity data of the at least one designated storage object using one or more beta distributions and one or more Poisson distributions.

15. The non-transitory processor-readable storage medium of claim 13, wherein using one or more machine learning techniques comprises using one or more machine learning-based Markov chain Monte Carlo algorithms.

16. The non-transitory processor-readable storage medium of claim 13, wherein generating the at least one multivariate data breach probability function comprises generating at least one probability density function.

17. An apparatus comprising:
at least one processing device comprising a processor coupled to a memory;
the at least one processing device being configured:
to configure at least one storage system by designating at least one storage object within the at least one storage system for storing data identified as to be protected from breach;
to generate at least one multivariate data breach probability function using at least one of historical performance data of the at least one designated storage object and historical capacity data of the at least one designated storage object, wherein generating the at least one multivariate data breach probability function comprises determining one or more data access patterns, pertaining to one or more amounts of data accessed per one or more temporal periods, associated with the at least one designated storage object by processing the at least one of historical performance data of the at least one designated storage object and historical capacity data of the at least one designated storage object;
to calculate at least one data breach score using (i) the at least one multivariate data breach probability function, (ii) one or more machine learning techniques, and (iii)

at least one of additional performance data of the at least one designated storage object and additional capacity data of the at least one designated storage object; and to perform one or more automated actions based at least in part on the at least one data breach score.

18. The apparatus of claim 17, wherein generating the at least one multivariate data breach probability function comprises processing the at least one of historical performance data of the at least one designated storage object and historical capacity data of the at least one designated storage object using one or more beta distributions and one or more Poisson distributions.

19. The apparatus of claim 17, wherein using one or more machine learning techniques comprises using one or more machine learning-based Markov chain Monte Carlo algorithms.

20. The apparatus of claim 17, wherein generating the at least one multivariate data breach probability function comprises generating at least one probability density function.

* * * * *